Feb. 23, 1965     E. VOSS ETAL     3,170,816
LEAD-ACID STORAGE BATTERY
Filed Oct. 12, 1960
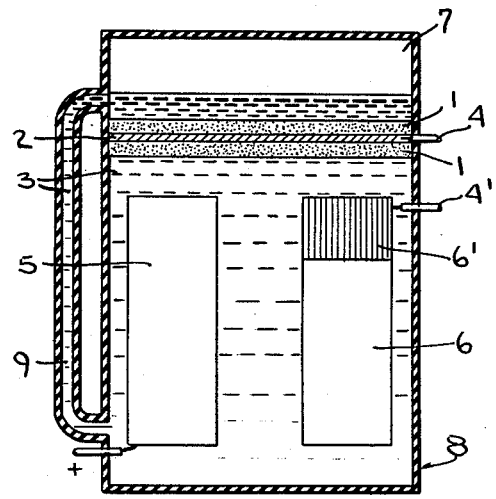
Fig. 1.
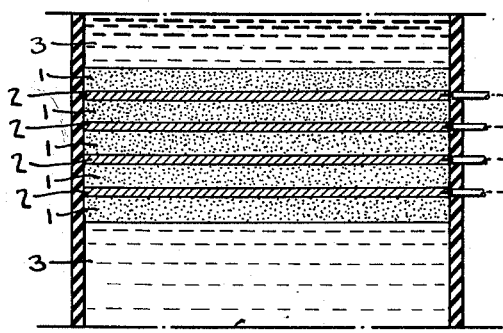
Fig. 2.
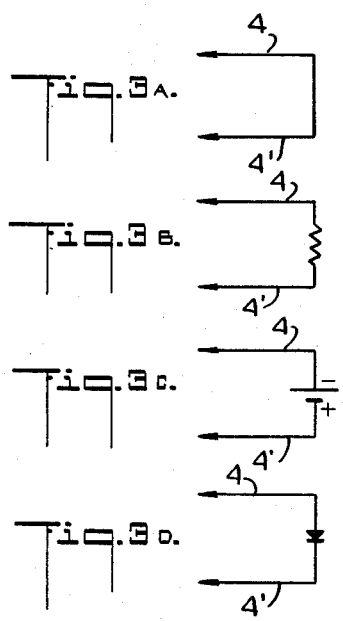
Fig. 3A.
Fig. 3B.
Fig. 3C.
Fig. 3D.
INVENTORS
ERNST VOSS
KLAUS DEHMELT
BY
Erich M H Radde.
AGENT United States Patent Office 3,170,816
Patented Feb. 23, 1965

3,170,816
LEAD-ACID STORAGE BATTERY
Ernst Voss and Klaus Dehmelt, Frankfurt am Main, Germany, assignors to Varta Aktiengesellschaft, Frankfurt am Main, Germany, a corporation of Germany
Filed Oct. 12, 1960, Ser. No. 62,200
Claims priority, application Germany, Oct. 14, 1959, A 33,046
14 Claims. (Cl. 136—3)

The present invention relates to lead-acid storage battery cells and more particularly to cells of this type, which are provided with a gas-consuming auxiliary electrode designed to consume the oxygen evolved at the positive plates during charging and overcharging and to prevent the evolution of hydrogen at the negative plates.

Hermetically closed alkaline battery cells are known, wherein the negative plates have been so constructed that the oxygen evolved during charging and overcharging is consumed and no hydrogen is evolved, whereby no damaging overpressures are produced in the interior of the sealed cell.

It has also been proposed to provide storage battery cells with gas-consuming auxiliary electrodes electrically connected with the positive and/or the negative electrodes. Known gas-consuming electrodes consist of noble metals, such as platinum, palladium, and the like, or of porous carbon impregnated with such noble metals. They are designed to effect an electro-chemical reaction between the oxygen and hydrogen evolved at the positive and negative electrodes whereby said gases are converted into water. Such auxiliary electrodes are, however, very expensive. They are also exceedingly sensitive to impurities and their gas-consuming activity decreases with use and age.

It is a primary object of the present invention to provide an auxiliary electrode for lead-acid storage battery cells, which consumes oxygen evolved at the positive plates and prevents substantially complete evolution of hydrogen at a fractional cost of that of the known noble metal electrodes and which is much less sensitive and more stable.

It is another object of this invention to provide a lead-acid storage battery cell requiring much less service than conventional storage batteries of this type and which may even be operated without any service for considerable periods of time in hermetically sealed containers.

Other objects of the present invention and advantageous features thereof will become apparent as the description proceeds.

The above and other objects and advantages are accomplished in accordance with the invention by providing lead-acid storage battery cells with a gas-consuming auxiliary electrode of a liquid mercurial substance which remains liquid at the temperature at which the storage battery cells are used and which may be pure mercury or a mercury alloy containing minor amounts of other metals which form substantially insoluble reaction products with the electrolyte, preferably metal alloys of lead, calcium, strontium, or barium. If the mercury is alloyed with lead, it preferably contains no more than about 1%, by weight, of lead. If the mercury is alloyed with one of the alkaline earth metals, it preferably contains no more than about 0.1%, by weight, of the alkaline earth metal.

In accordance with a preferred embodiment, the gas-consuming auxiliary electrode is electrically connected with the negative electrode so that it always has the same potential as the negative electrode. The electrical connection may be a short circuit or it may include a resistance. In some instances, it will be advantageous to provide an auxiliary voltage source in the electrical connection between the negative electrodes and the auxiliary electrode.

Deep discharge of storage battery cells may cause the negative electrode to assume a positive polarity. Thereby the mercurial substance of the auxiliary electrode would be oxidized if no provisions were made to avoid such change in polarity of said auxiliary electrode. To prevent such oxidation of the auxiliary electrode, it is preferred to place a rectifier into the electrical connection between the negative electrodes and the auxiliary electrode, the recifier being effective to permit flow of electrons only in the direction of the auxiliary electrode and to prevent electron flow from the auxiliary electrode.

In the embodiment illustrated herein, the liquid mercurial auxiliary electrode consists of a thin layer of the mercurial material, or preferably a plurality of such layers arranged in superposed relationship, each mercurial material layer being held between two porous plates of a material substantially inert to the electrolyte. The auxiliary electrode assembly is arranged within the electrolyte above the positive and negative plates and both sides of the auxiliary electrode layer are accessible to the electrolyte.

The porous plates may be of glass or a suitable synthetic resin, such as polystyrene or polyurethane, and the pores must be large enough to permit easy passage of oxygen without permitting the liquid mercurial electrode material to seep through. Pore diameters of about $40\mu$ to $90\mu$ have been found suitable and the thickness of the plates may vary, for instance, between about 2 mm. and 5 mm. and is preferably about 3 mm. The oxygen pressure may be adjusted by changing the thickness of the porous support plates for the mercurial electrode which consumes the oxygen.

The storage battery cell container of a cell provided with an auxiliary electrode according to this invention may be permanently and hermetically sealed. In this case, it has been found advantageous to provide the negative electrode of the cell with a higher charging capability than the positive electrode, i.e., a charge reserve portion. The charge reserve portion constitutes that part of the negative electrode which is not charged, i.e., in the case of lead-acid cells it consists during operation essentially of lead sulfate ($PbSO_4$). When the cell is assembled and the negative electrode is built thereinto, the charge reserve portion thereof may consist of lead oxide, basic lead sulfate, and/or lead sulfate. During operation, the lead oxide and basic lead sulfate are converted into lead sulfate.

The provision of such a charge reserve portion gives the assurance that there definitely will be no hydrogen evolution even if there are, for instance, manufacturing inaccuracies in the amount of the active mass, thus guaranteeing satisfactory operation of the hermetically sealed cell under all conditions.

The above and other objects, advantages and features of the present invention will be more fully understood in connection with the following description of certain preferred embodiments thereof, taken in conjunction with the accompanying drawing wherein FIG. 1 is a vertical section schematically showing a hermetically seal lead-acid storage battery cell according to the present invention;

FIG. 2 is an enlarged vertical section of a modified auxilary electrode structure for use in the cell of FIG. 1; and FIGS. 3a to 3d illustrate electrical connections between the negative electrode and the auxiliary electrode of the cell of FIG. 1.

Referring now to FIG. 1, there is shown a hermetically sealed storage battery cell container 8 provided with an electrolyte by-pass conduit 9 which is shown to be integral with the container. Any conventional storage battery cell container material may be used, the essential requirement being its inertness to the electrolyte. Such container materials as vulcanized rubber, compositions of thermoplastic, bituminous materials, usually containing asphalts, asphaltites, inert fillers, fibrous materials and lampblack, polyester and other plastics, glass and ceramic are useful, for example.

The cell container holds a conventional liquid sulfuric acid electrolyte 3, a gassing chamber 7 being defined between the upper level of the electrolyte and the sealed container. Arranged within the electrolyte are conventional sets of negative electrode plates 6 and positive electrode plates 5, respective negative and positive leads being connected to these plates in a conventional manner. As conventional, the positive plates are primarily of lead dioxide and the negative plates of lead. As shown, the negative electrode 6 has a charge reserve portion 6' of lead sulfate ($PbSO_4$).

In accordance with this invention, there is immersed in the electrolyte and arranged above the positive and negative plates a gas-consuming auxiliary electrode constituted by a thin layer of a liquid mercurial substance 2, for instance, substantially pure mercury. The liquid mercurial electrode layer 2 is held and interposed between two porous plates 1, 1 of a material inert to sulfuric acid, for instance, glass. Since the by-pass 9 permits the liquid electrolyte to pass above the auxiliary electrode, both sides of the mercurial layer are accessible to the electrolyte liquid, the pores of the porous plates being large enough to permit electrolyte to contact the mercurial layer and to permit passage of oxygen but so small as to retain the liquid mercurial substance and to prevent its seepage into the electrolyte.

Preferably, there is an electrical connection between the auxiliary electrode and the negative electrode, for which purpose respective leads 4 and 4' are shown in FIG. 1. FIGS. 3a to 3d indicate various types of suitable electrical connections, FIG. 3a showing a short circuit connection between the auxiliary and the negative electrode, FIG. 3b showing a resistance mounted in the connection, FIG. 3c illustrating an auxiliary voltage source, such as a battery, in the connection and FIG. 3d showing a rectifier in the connection, which permits only a unidirectional flow of electrons toward the auxiliary electrode.

A preferred auxiliary electrode structure is shown in FIG. 2. Instead of the single mercurial layer 2 of FIG. 1, there are provided a plurality of superposed layers 2 interposed between porous plates 1. As shown, all the electrode layers 2 are electrically interconnected at 4 to constitute a single electrical unit. Obviously, such an auxiliary electrode assembly may be built into the cell of FIG. 1 instead of the simple auxiliary electrode illustrated therein.

Storage battery cells of the illustrated structure and the indicated container, electrode, and electrolyte materials have been built with pure mercury auxiliary electrodes supported by porous, for instance, fritted preferably sintered glass plates of about 3 mm. thickness and with an average pore diameter of about $60\mu$ to $70\mu$. Porous plate thicknesses between about 2 mm. to 5 mm. have been found acceptable although the thickness is not critical. Pore diameters may vary upward to about $90\mu$ and downward to about $40\mu$. The thickness of the mercurial electrode layers may be about the same as that of the porous support plates or a little less.

Instead of using pure mercury, liquid mercury alloys have also been found useful for the auxiliary electrode. For instance, we have used a mercury-lead alloy containing no more than about 1%, by weight, of lead at 0° C., as well as mercury alloyed with no more than about 0.1%, by weight, of the alkaline earth metals, calcium, strontium, or barium, at 0° C.

It is a particular advantage of storage battery cells constructed according to the present invention, that water decomposition is held to a minimum because of the consumption of the evolving oxygen and the corresponding prevention of hydrogen evolution. Therefore, the battery needs little service even when operated in an open container. If the cell is hermetically sealed, it may be operated for years without servicing and without any danger of drying up. Such a hermetically sealed cell has, of course, other advantages, such as the avoidance of seepage of corrosive liquids. Therefore, it may be used in instruments and apparatus comprising corrosive parts which would be damaged by contact with the electrolyte or even electrolyte vapors.

While the invention has been described in connection with certain preferred embodiments, it will be clearly understood that many variations and modifications may occur to the skilled in the art without departing from the spirit and scope of this invention as defined in the appended claims.

We claim:

1. A lead-acid storage battery cell comprising a liquid acidic electrolyte and, within the electrolyte, a positive lead electrode, a negative lead electrode, and a gas consuming auxiliary electrode of a liquid mercurial substance selected from the group consisting of mercury and mercury alloys, porous plates of a material substantially inert to the electrolyte being provided for holding the liquid mercurial substance therebetween, the plates having pore diameters between about $40\mu$ and about $90\mu$.

2. The lead-acid storage battery cell of claim 1, wherein the auxiliary electrode consists of a mercury-lead alloy containing a maximum of 1%, by weight, of lead at a temperature of 0° C.

3. The lead-acid storage battery cell of claim 1, wherein the auxiliary electrode consists of a mercury-alkaline earth metal alloy containing a maximum of 0.1%, by weight, of the alkaline earth metal at a temperature of 0° C., the alkaline earth metal being selected from the group consisting of strontium, calcium, and barium.

4. A lead-acid storage battery cell comprising a liquid acidic electrolyte and, within the electrolyte, a positive lead electrode, a negative lead electrode, and an oxygen-consuming auxiliary electrode of a liquid mercurial substance selected from the group consisting of mercury and mercury alloys, the auxiliary electrode being electrically connected to the negative electrode, the mercury alloys being selected from the group consisting of a mercury-lead alloy containing a maximum of 1%, by weight, of lead at a temperature of 0° C., and mercury-alkaline earth metal alloys containing a maximum of 0.1%, by weight, of an alkaline earth metal at a temperature of 0° C., the alkaline earth metal being selected from the group consisting of calcium, strontium, and barium, and porous plates of a material substantially inert to the electrolyte being provided for holding the liquid mercurial substance therebetween, the plates having pore diameters between about $40\mu$ and about $90\mu$.

5. A lead-acid storage battery cell comprising a liquid acidic electrolyte and, within the electrolyte, a positive lead electrode, a negative lead electrode, and a gas-consuming auxiliary electrode of a liquid mercurial substance selected from the group consisting of mercury and mercury alloys, porous plates of a material substantially inert to the electrolyte being provided for holding the liquid mercurial substance therebetween, the plates having pore diameters between about $40\mu$ and about $90\mu$, and an electrical connection between the negative electrode and the gas-consuming auxiliary electrode.

6. The lead-acid storage battery cell of claim 5, wherein said electrical connection is a short circuit between the negative electrode and the auxiliary electrode.

7. The lead-acid storage battery cell of claim 5, wherein the electrical connection includes a resistance.

8. The lead-acid storage battery cell of claim 5, wherein the electrical connection includes an auxiliary voltage source.

9. The lead-acid storage battery cell of claim 5, wherein said electrical connection includes a rectifier effective to permit flow of electrons only in the direction of the auxiliary gas-consuming electrode.

10. The lead-acid storage battery cell of claim 1, wherein said inert plate material is selected from the group consisting of glass and synthetic resins.

11. The lead-acid storage battery cell of claim 1, wherein said porous plates have a thickness between about 2 mm. and 5 mm.

12. A lead-acid storage battery cell comprising a positive lead electrode, a negative lead electrode, a liquid acidic electrolyte, and a gas-consuming auxiliary electrode of a liquid mercurial substance selected from the group consisting of mercury and mercury alloys, said auxiliary electrode consisting of a plurality of superposed layers of said mercurial substance and porous plates of a material substantially inert to the electrolyte, the plates having pore diameters between about $40\mu$ and about $90\mu$, each of said electrode layers being interposed between two of the porous plates, and electrically connected to the negative electrode, and the auxiliary electrode being arranged within the electrolyte above the positive and negative electrodes.

13. A lead-acid battery cell comprising a positive lead electrode, a negative lead electrode, a gas-consuming auxiliary electrode of a liquid mercurial substance selected from the group consisting of mercury and mercury alloys, porous plates of a material substantially inert to the electrolyte being provided for holding the liquid mercurial substance therebetween, the plates having pore diameters between about $40\mu$ and about $90\mu$, a liquid acidic electrolyte surrounding said electrodes, the auxiliary electrode being electrically connected to the negative electrode, and a hermetically sealed container for said electrolyte.

14. The lead-acid battery cell of claim 13, wherein the surface of the electrolyte and the container define a gassing chamber.

References Cited by the Examiner
UNITED STATES PATENTS

| | | | |
|---|---|---|---|
| 873,220 | 12/07 | Edison | 136—28 |
| 2,697,736 | 12/54 | Goldberg | 136—26 |
| 2,857,447 | 10/58 | Lindstrom | 136—6 |
| 2,934,581 | 4/60 | Dassler | 136—28 |
| 2,951,106 | 8/60 | Ruetschi | 136—26 |

OTHER REFERENCES

International Critical Tables, vol. 6, 1929.

Meites: Advanced Analytical Chemistry, N.Y., McGraw-Hill Co., 1958, page 212.

JOHN H. MACK, *Primary Examiner.*

JOHN R. SPECK, MURRAY TILLMAN, *Examiners.*